US009842470B2

(12) United States Patent
Marks

(10) Patent No.: US 9,842,470 B2
(45) Date of Patent: Dec. 12, 2017

(54) METHOD OF GAMING, A GAMING SYSTEM AND A GAME CONTROLLER

(71) Applicant: Aristocrat Technologies Australia Pty Limited, North Ryde (AU)

(72) Inventor: Daniel Marks, Decatur, GA (US)

(73) Assignee: ARISTOCRAT TECHNOLOGIES AUSTRALIA PTY LIMITED (AU)

( * ) Notice: Subject to any disclaimer, the term of this patent is extended or adjusted under 35 U.S.C. 154(b) by 176 days.

(21) Appl. No.: 14/821,999

(22) Filed: Aug. 10, 2015

(65) Prior Publication Data

US 2016/0042595 A1 Feb. 11, 2016

(30) Foreign Application Priority Data

Aug. 11, 2014 (AU) ................................ 2014903119

(51) Int. Cl.
*G06F 17/00* (2006.01)
*G07F 17/32* (2006.01)

(52) U.S. Cl.
CPC ................................ *G07F 17/3265* (2013.01)

(58) Field of Classification Search
None
See application file for complete search history.

(56) References Cited

U.S. PATENT DOCUMENTS 9,208,655 B2 * 12/2015 Aida .................. G07F 17/3267
9,342,961 B2 * 5/2016 Kim .................... G07F 17/3262
2012/0208613 A1 * 8/2012 Barbalet ............. G07F 17/3211 463/11
2014/0248939 A1 * 9/2014 Kroon .................... G07F 17/34 463/20

* cited by examiner

*Primary Examiner* — Ronald Laneau
(74) *Attorney, Agent, or Firm* — McAndrews, Held & Malloy, Ltd.

(57) ABSTRACT

A method of gaming in a gaming system comprising; generating a game outcome by spinning a plurality of reels to respective stop positions at which a plurality of symbols of each reel are displayed at respective ones of a plurality of symbol display positions; controlling spinning of the reels prior to the reels reaching their respective stop positions to include a first mode in which all of the reels spin independently of each other, and a second mode in which at least two adjacent reels are synchronized to spin together; evaluating the game outcome to determine whether to make an award in respect of the game outcome; and making any determined award.

33 Claims, 6 Drawing Sheets

METHOD OF GAMING, A GAMING SYSTEM AND A GAME CONTROLLER

RELATED APPLICATIONS

This application claims priority to Australian Provisional Patent Application No. 2014903119 having an International filing date of Aug. 11, 2014, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In electronic gaming systems such as spinning reel or "slot" gaming machines, the reels are spun and stop in a position at which a set of symbols are displayed on a display of the machine. The displayed symbols are evaluated to determine whether an award is to be made to a player.

While such gaming systems provide players with enjoyment, a need exists for alternative gaming systems.

BRIEF SUMMARY OF THE INVENTION

In a first aspect, there is provided a method of gaming in a gaming system comprising:

generating a game outcome by spinning a plurality of reels to respective stop positions at which a plurality of symbols of each reel are displayed at respective ones of a plurality of symbol display positions;

controlling spinning of the reels prior to the reels reaching their respective stop positions to include a first mode in which all of the reels spin independently of each other, and a second mode in which at least two adjacent reels are synchronized to spin together;

evaluating the game outcome to determine whether to make an award in respect of the game outcome; and making any determined award.

In an embodiment, the second mode is subsequent to the first mode.

In an embodiment, further comprises controlling the at least two reels to spin in a transition mode between the first and second modes during which spinning the at least two reels synchronize.

In an embodiment, the at least two reels are a subset of the reels and remaining reels spin independently of one another and the synchronized reels during the second mode.

In an embodiment, the method comprises adding symbols to each of the synchronized reels prior to or during the second mode.

In an embodiment, there are five reels.

In an embodiment, two reels are synchronized.

In an embodiment, three reels are synchronized.

In an embodiment, four reels are synchronized.

In an embodiment, five reels are synchronized.

In an embodiment, the method comprises, subsequent to the second mode, controlling spinning of the reels so that in a third mode at least one additional reel of the plurality of reels is synchronized to spin together with the at least two reels.

In an embodiment, the method comprises determining that a mode change condition is met and switching between the first and second modes upon the mode change condition being met.

In a second aspect, there is provided a game controller for a gaming system, the game controller arranged to:

generate a game outcome by spinning a plurality of reels to respective stop positions at which a plurality of symbols of each reel are displayed at respective ones of a plurality of symbol display positions, control spinning of the reels prior to the reels reaching their respective stop positions to include a first mode in which all of the reels spin independently of each other, and a second mode in which at least two adjacent reels are synchronized to spin together;

evaluate the game outcome to determine whether to make an award in respect of the game outcome; and make any determined award.

In an embodiment, the second mode is subsequent to the first mode.

In an embodiment, the game controller is further configured to control the at least two reels to spin in a transition mode between the first and second modes during which the at least two reels synchronize.

In an embodiment, the at least two reels are a subset of the reels and remaining reels spin independently of one another and the synchronized reels during the second mode.

In an embodiment, the game controller is further configured to add symbols to each of the synchronized reels prior to or during the second mode.

In an embodiment, there are five reels.

In an embodiment, two reels are synchronized.

In an embodiment, three reels are synchronized.

In an embodiment, four reels are synchronized.

In an embodiment, five reels are synchronized.

In an embodiment, the game controller is configured to, subsequent to the second mode, control spinning of the reels so that in a third mode at least one additional reel of the plurality of reels is synchronized to spin together with the at least two reels.

In an embodiment, the game controller is configured to determine that a mode change condition is met and switch between the first and second modes upon the mode change condition being met.

In a third aspect, there is provided a gaming system comprising:

an outcome generator arranged to a game outcome by spinning a plurality of reels to respective stop positions at which a plurality of symbols of each reel are displayed at respective ones of a plurality of symbol display positions;

a reel spin controller arranged to control spinning of the reels prior to the reels reaching their respective stop positions to include a first mode in which all of the reels spin independently of each other, and a second mode in which at least two adjacent reels are synchronized to spin together; and an outcome evaluator arranged to evaluate the game outcome to determine whether to make an award in respect of the game outcome, and make any determined award.

In an embodiment, the gaming system further comprises a display for displaying spinning of the reels.

In an embodiment, the second mode is subsequent to the first mode.

In an embodiment, the reel spin controller is arranged to control the at least two reels to spin in a transition mode between the first and second modes during which the at least two reels synchronize.

In an embodiment, the at least two reels are a subset of the reels and remaining reels spin independently of one another and the synchronized reels during the second mode.

In an embodiment, the gaming system is further arranged to add symbols to each of the synchronized reels prior to or during the second mode.

In an embodiment, there are five reels.

In an embodiment, two reels are synchronized.

In an embodiment, three reels are synchronized.

In an embodiment, four reels are synchronized.

In an embodiment, five reels are synchronized.

In an embodiment, the reel spin controller is arranged to, subsequent to the second mode, control spinning of the reels so that in a third mode at least one additional reel of the plurality of reels is synchronized to spin together with the at least two reels.

In an embodiment, the gaming system comprises a mode change monitor arranged to determine that a mode change condition is met and, wherein the reel spin controller, switches between the first and second modes upon the mode change condition being met.

In a fourth aspect, there is provided a gaming system comprising:

means for generating a game outcome by spinning a plurality of reels to respective stop positions at which a plurality of symbols of each reel are displayed at respective ones of a plurality of symbol display positions;

means for controlling spinning of the reels prior to the reels reaching their respective stop positions to include a first mode in which all of the reels spin independently of each other, and a second mode in which at least two adjacent reels are synchronized to spin together;

means for evaluating the game outcome to determine whether to make an award in respect of the game outcome; and means for making any determined award.

In a fifth aspect, there is provided computer program code which when executed by a processor:

generates a game outcome by spinning a plurality of reels to respective stop positions at which a plurality of symbols of each reel are displayed at respective ones of a plurality of symbol display positions;

controls spinning of the reels prior to the reels reaching their respective stop positions to include a first mode in which all of the reels spin independently of each other, and a second mode in which at least two adjacent reels are synchronized to spin together;

evaluates the game outcome to determine whether to make an award in respect of the game outcome; and makes any determined award.

In a sixth aspect, there is provided a tangible computer readable medium comprising the above computer program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
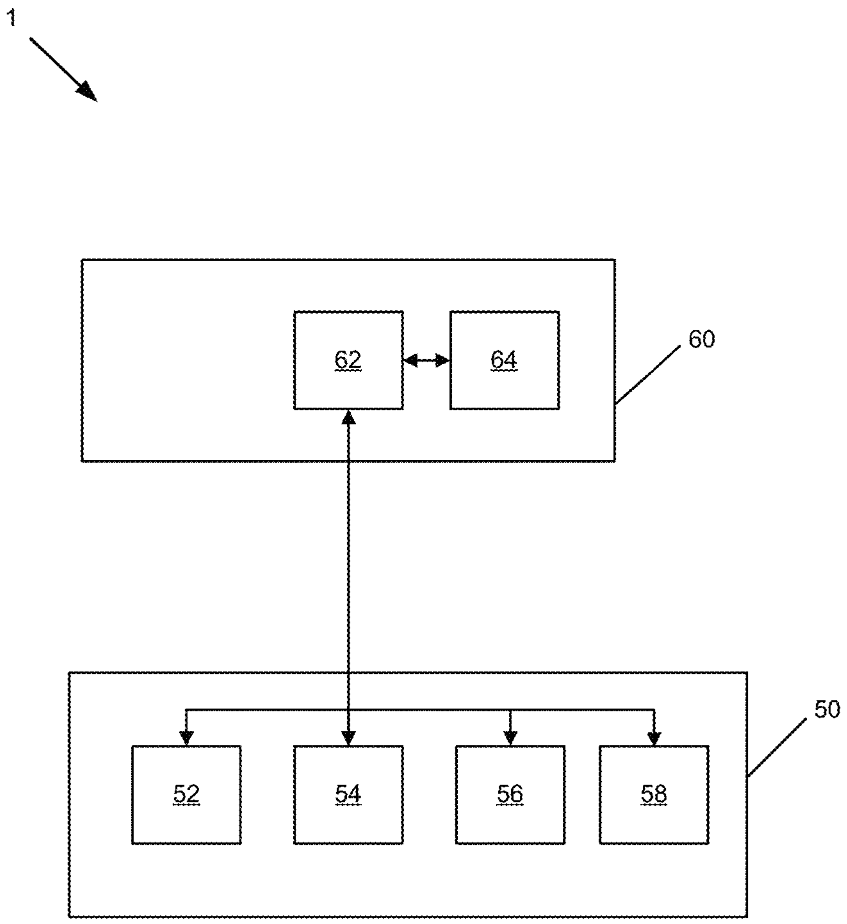
FIG. 1 is a block diagram of the core components of a gaming system.

Referring to the drawings, there is shown an embodiment of an electronic gaming system having an electronic game controller that has components that enable the implementation of a game wherein a plurality of reels are spun to stop positions at which a plurality of symbols of each reel are displayed at respective ones of a plurality of symbol display positions. The method of an embodiment involves the game controller controlling spinning of the reels prior to the reels reaching their respective stop positions to include a first mode in which all of the reels spin independently of each other, and a second mode in which at least two adjacent reels are synchronized to spin together.

General Construction of Gaming System

The gaming system can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a “thick client” architecture may be used wherein part of the game is executed on a player operable gaming machine and part of the game is executed remotely, such as by a gaming server; or a “thin client” architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in standalone gaming machine mode, “thick client” mode or “thin client” mode depending on the game being played, operating conditions, and so on. Other variations will be apparent to persons skilled in the art.

Irrespective of the form, the gaming system 1 has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
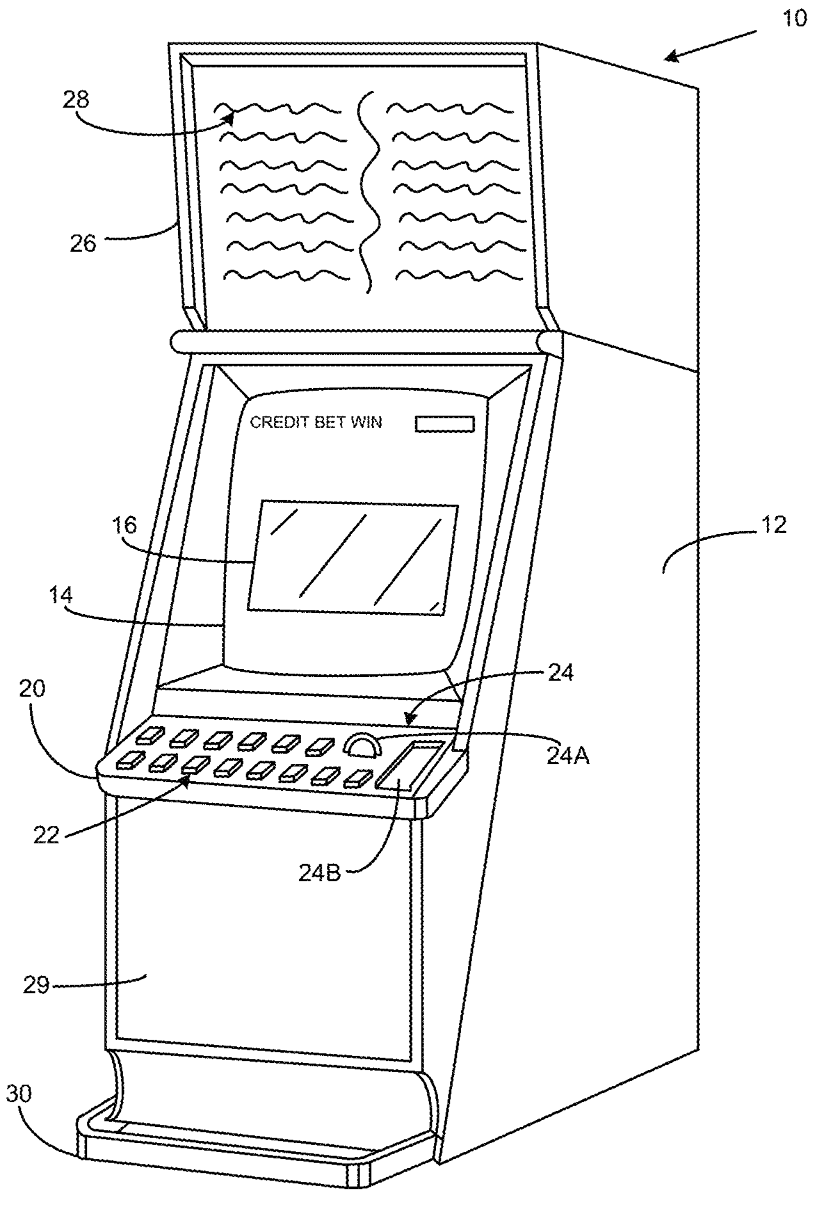
FIG. 2 is a perspective view of a standalone gaming machine.

A gaming system in the form of a standalone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
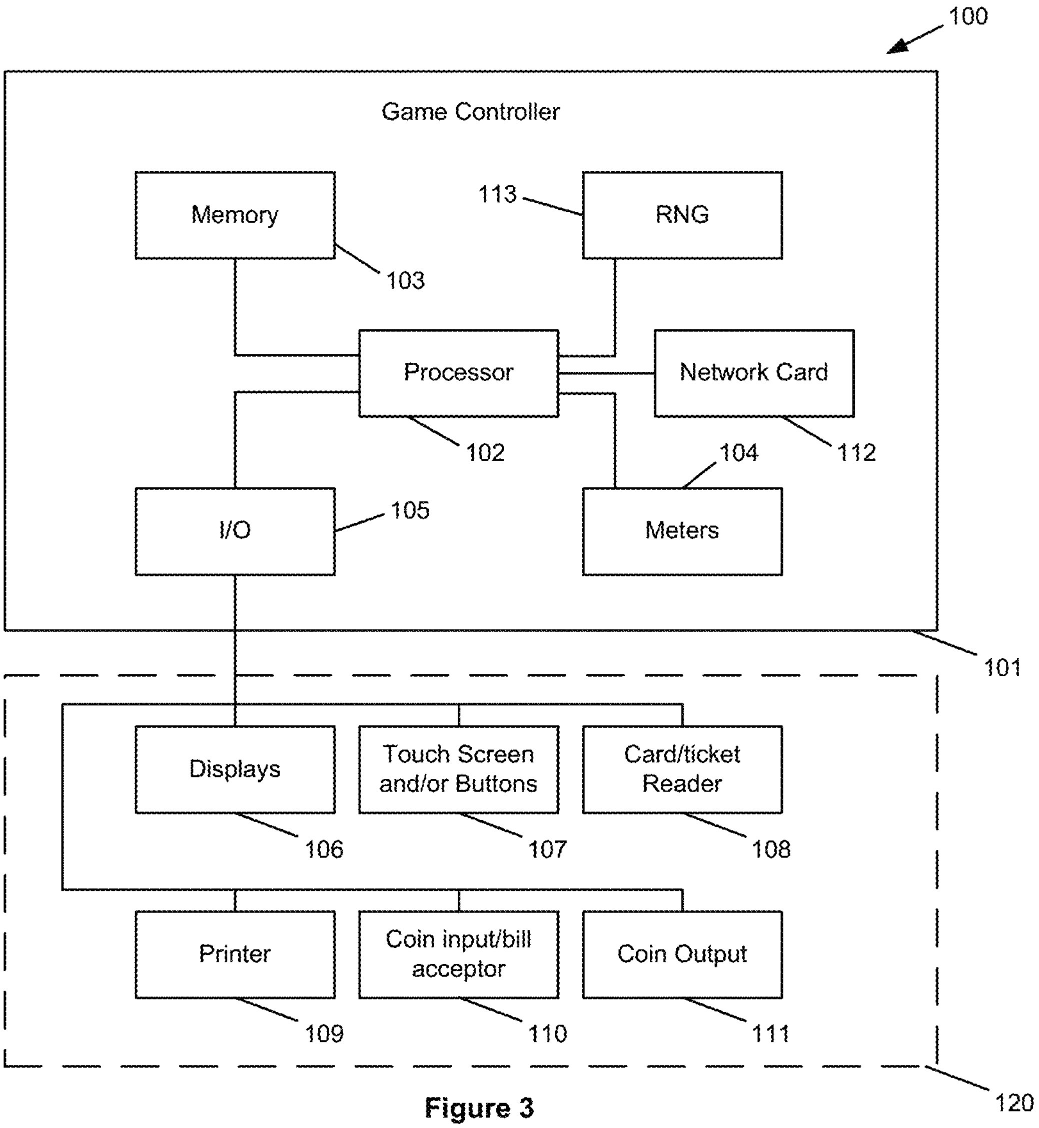
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
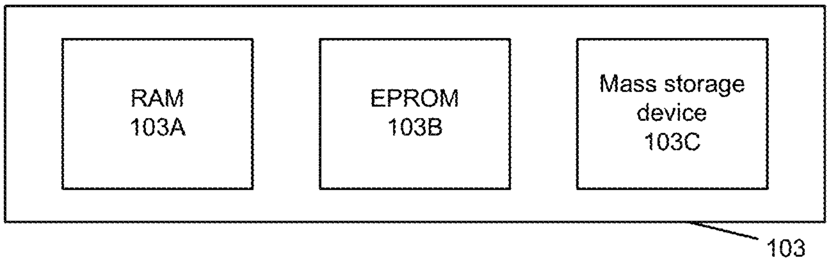
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106, 107, 108, 109, 110, 111 to be provided remotely from the game controller 101.

Figure 5:
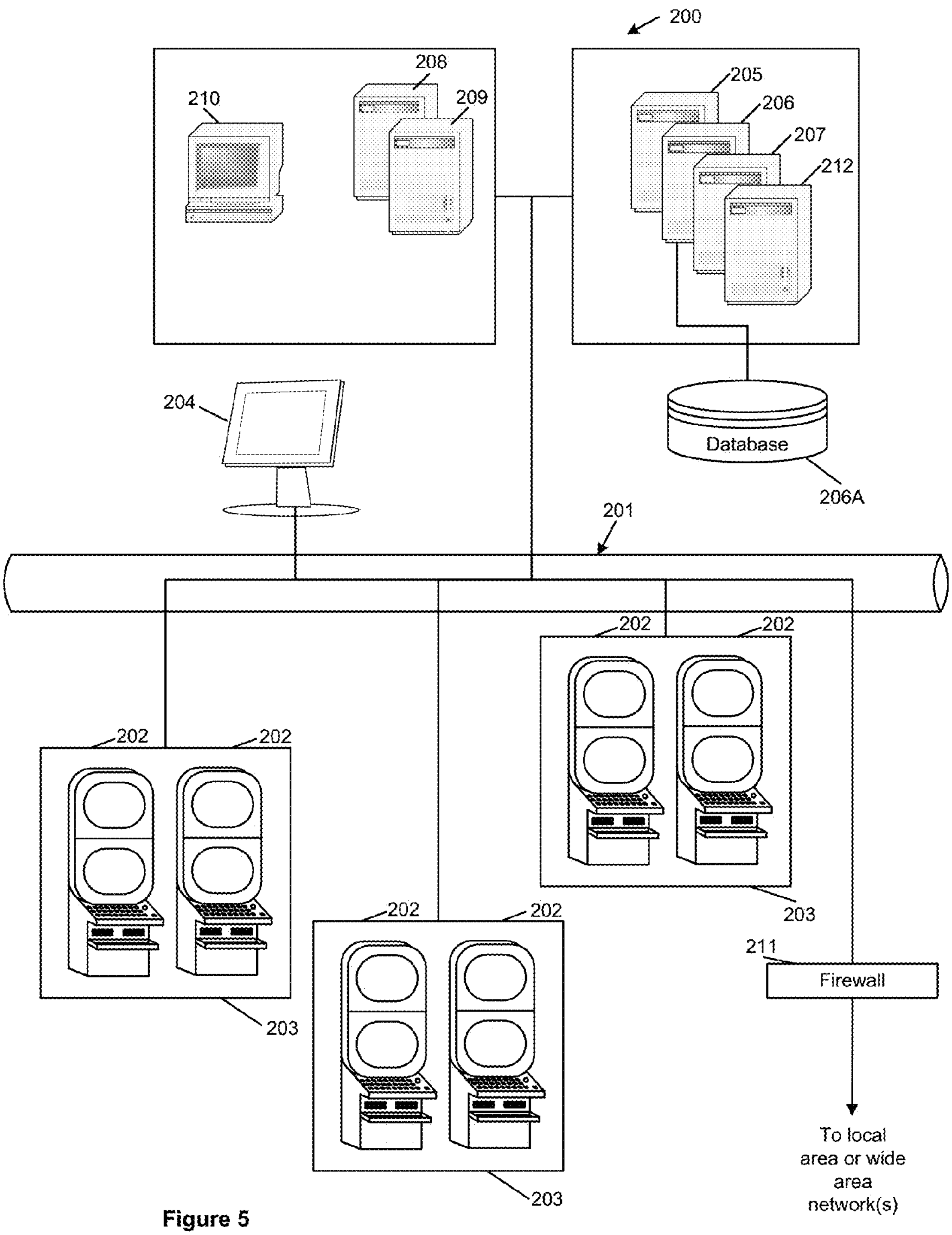
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5 are connected to the network 201. The gaming machines 202 provide a player operable interface and may be the same as the gaming machines 10, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

In an embodiment of the invention, the player operates the game play mechanism 56 to specify a wager and hence the win entitlement which will be evaluated for this play of the game and initiates a play of the game. Persons skilled in the art will appreciate that a player's win entitlement will vary from game to game dependent on player selections. In most spinning reel games, it is typical for the player's entitlement to be affected by the amount they wager and selections they make (i.e. the nature of the wager). For example, a player's win entitlement may be based on how many lines they play in each game—e.g. a minimum of one line up to the maximum number of lines allowed by the game (noting that not all permutations of win lines may be available for selection) and how much they wager per line. Such win lines are typically formed by a combination of symbol display positions, one from each reel, the symbol display positions being located relative to one another such that they form a line.

In many games, the player's win entitlement is not strictly limited to the lines they have selected, for example, "scatter" pays are awarded independently of a player's selection of paylines and are an inherent part of the win entitlement.

Persons skilled in the art will appreciate that in other embodiments, the player may obtain a win entitlement by selecting a number of reels to play and an amount to wager per reel. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

Figure 6:
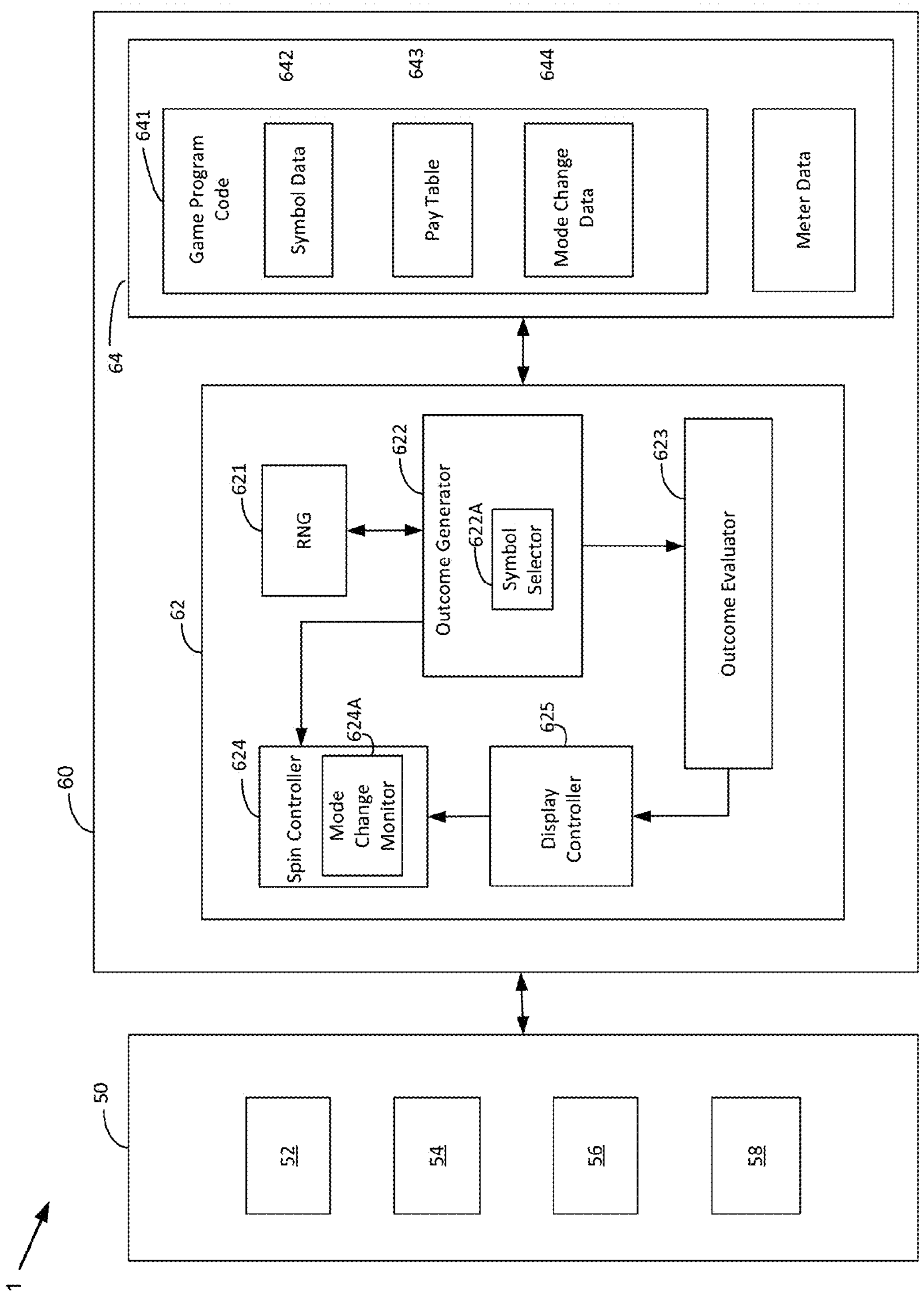
FIG. 6 is a further block diagram of a gaming system.

In FIG. 6, the processor 62 of game controller 60 of gaming system 1 is shown implementing a number of modules based on game program code 641 stored in memory 64. Persons skilled in the art will appreciate that various of the modules could be implemented in some other way, for example by a dedicated circuit.

These modules include the outcome generator 622 which operates in response to the player's operation of game play mechanism 56 to place a wager and initiate a play of the game and generates a game outcome which will then be evaluated by outcome evaluator 623. The first part of forming the game outcome is for a symbol selector 622A to select symbols from a set of symbols specified by symbol data 641 using random number generator 621. The selected symbols are advised to the display controller 625 which causes them to be displayed as a symbol display on display 54 at a set of display positions.

In an embodiment, the display positions of the symbol display are arranged in a rectangular matrix comprising a plurality of columns and a plurality of rows. However, other arrangements are known in the gaming industry and could be employed in embodiments of the invention. For example, in some arrangements there are more symbols in some columns than others, such as 3-4-3-4-3 arrangement of seventeen display positions corresponding to respective ones of five reels. In such arrangements, the columns of four symbols can be arranged so that they are off-set or staggered relative to the columns having three symbols so that the middle two symbols in the columns of four symbols share boundaries with two symbols of each neighbouring reel.

In an embodiment, the outcome generator 622 is arranged to generate a game outcome. All outcomes are displayed on display 54 under control of display controller 625. One example of generating a first game outcome is for the symbol selector 622A to select symbols for display from symbol data 641 in the form of a plurality of symbol sets corresponding to respective ones of a plurality of reels. The symbol sets specify a sequence of symbols for each reel such that the symbol selector 622A can select all of the symbols to be displayed for each reel by selecting a stopping position in the sequence based on a value obtained from random number generator 621. In one example, three symbols of each of five reels may be displayed such that symbols are displayed at fifteen display positions on display 54. It is known to use a probability table stored in memory 64 to vary the odds of a particular stop position being selected. Other techniques can be used to control the odds of particular outcomes occurring to thereby control the return to player of the game.

In an embodiment of the invention, spinning of the reels is controlled by spin controller 624. In one embodiment, the spin controller 624 initially spins all reels independently in first mode known as a "pre-spin" mode, synchronizes the spin of one or more adjacent reels during a transition mode known as a "locking" mode, and then, in a second mode, spins the unsynchronized and synchronized reels in a "spin" or "locked" mode.

In an embodiment, there is a change between spin modes only when a mode change condition is met 644. The mode change condition may be based on a random evaluation, triggered by a symbol combination occurring in the game, scheduled to occur with a designated frequency, be based on a wager etc. In this embodiment, the spin controller has a mode change monitor 624A that monitors for the mode change condition 644 to be met and caused the game controller to change the spin mode in response to the condition being met. When the condition is not met, the reels spin independently.

In some embodiments there may be additional modes, for example, a third mode where at least one additional reel is "locked" so it spins with the at least two reels that spin together in the second mode. This additional locking may occur at the same time that the first two reels or at a later time so that the third reel joins the first and second reels. Depending on the embodiment there may be alternative orderings of the modes. Depending on the embodiment any number of reels may "lock". For example, embodiments are possible where four or five reels lock together. For example, an embodiment where two pairs of reels lock.

In addition, the method may include additional modes, such as a symbol insertion mode wherein the game controller inserts a symbol or a stack of symbols into each of the locked reels at some time before they stop. For example, a stack of three identical symbols may be added to each reel after they have locked. In another example, symbols may be inserted before the reels lock to indicate that reels are about to lock.

Further, in some embodiments the first, pre-spin mode may not be displayed to the player. For example, the spinning could occur in the background and only be displayed to the player once the transition mode starts or even only once the reels are locked.

In some embodiment, visual changes may be made to the symbols to indicate to the player that the reels have been locked. For example, the symbols at the locked positions could be replaced by larger symbols that occupy the aligned symbols on the two reels. These may be "large" or "unified" images that represent the collection of aligned symbols. For example, if two symbols are the same, an enlarged version of the same symbol may be displayed, with the centre of the enlarged symbol corresponding to the centre of the two reels. This symbol could be a 2×1 symbol (i.e. occupying two adjacent positions but one row) but could also be other sizes depending on the nature of the symbols that are locked. For example, if the same symbol occupies two adjacent positions on the same reel and those symbol positions are locked, a single symbol could be shown in a 2×2 array of symbol display positions. Similarly, the stacked symbols that may be added in some embodiments may be displayed as a single larger symbol. In other embodiments, the display of locked reels could be altered to indicate that the reels are locked, for example, by adding a highlighting colour to the reels or by removing the border between reels.

Once the spinning reels come to a stop to form a symbol display, they are evaluated by the outcome evaluator 623 to determine whether they include any winning combinations in pay table 643 to determine whether to make an award. Any award is added to the win meter maintained in memory 64 as part of meter data 648. The meter data 648 also includes the current value of a credit meter. The current values of the credit and win meters are displayed on display 54 by the display controller 625. Wins are transferred from the win meter to the credit meter at the end of a play of the game. Wagers are deducted from the credit meter when play of a game commences.

It will be appreciated that in some embodiments, the game controller may be configured so that the use of multiple spinning modes may only occur during part of the game, such as during a feature game. In other embodiments, the spinning modes may occur in both the base and the feature games. Game outcomes may be generated in the feature game in the same manner as in a base game or differently. The base game is a part of the game which is carried out each time the player makes a wager, typically irrespective of the wager, whereas typically the feature game the game will only be carried out occasionally for example if a condition is met such as a trigger.

The trigger event for a feature game may be a symbol combination in the game, occurrence of a specific symbol in the game, purchased, be caused by another connected system, based on turnover, based on a random evaluation, etc.

Figure 7:
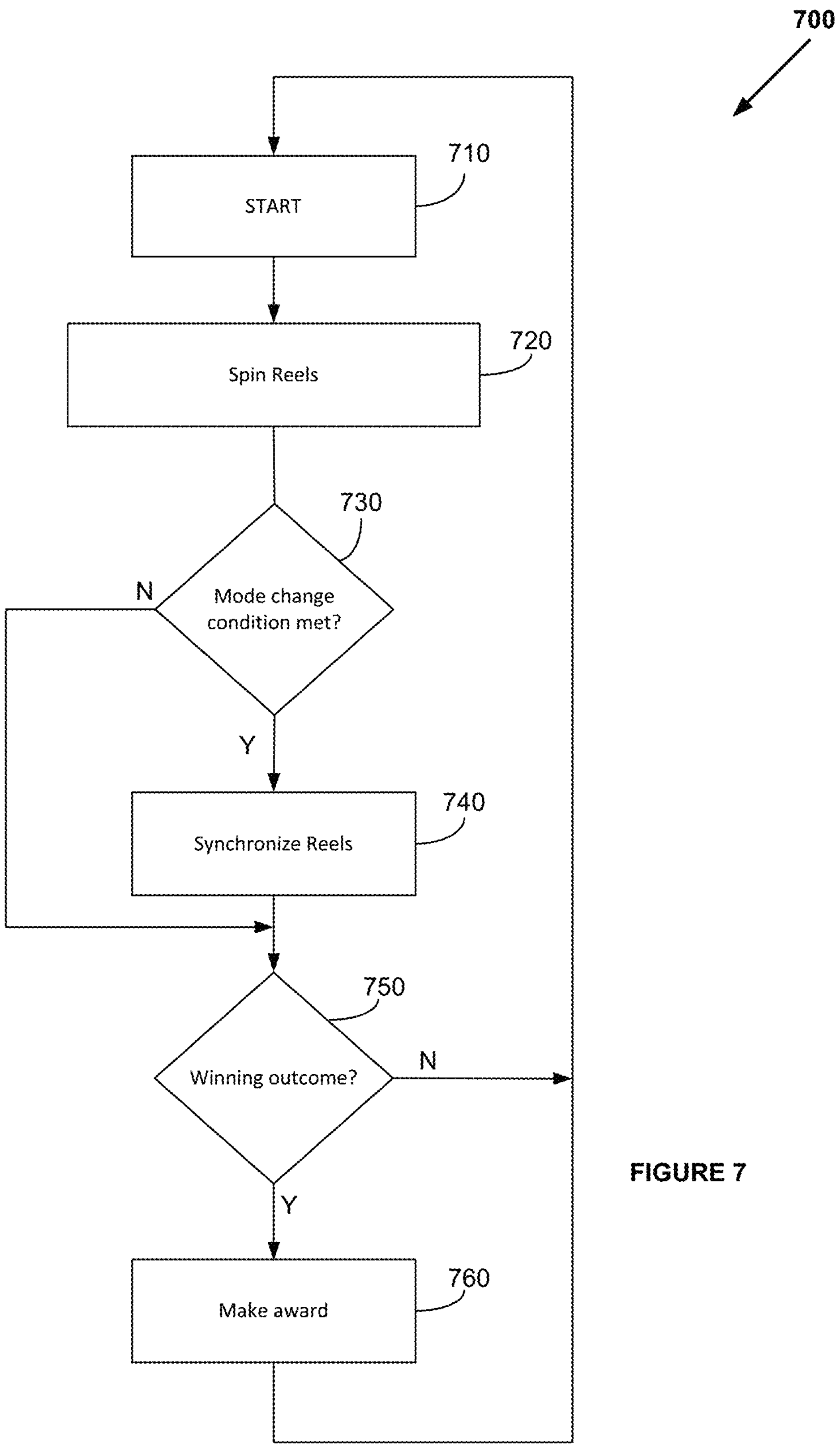
FIG. 7 is a flow chart of an embodiment.

Referring to FIG. 7, there is shown a method 700 of an embodiment of the invention. In the method 700, after game play starts 710, the method involves spinning the reels 730. If a mode change condition is met, at least two reels are synchronized 740. It is then determined 75—whether the game outcome is a winning outcome. If the game outcome is a winning outcome, an award is made 760 from the pay table.

EXAMPLES

Example 1

In a first example, the spin controller controls display of spinning of the reels so that each of the reels spins independently in a first mode, and this is displayed to the player on the display. The spin controller controls display of spinning of the reels so that the reels then lock in a second mode and are displayed as spinning together until reaching a stopping position.

Example 2

In a second example, the spin controller controls display of spinning of the reels so that each of the reels spins independently in a first mode, and this is displayed to the player on the display. There is a transition mode during which the spin controller controls display of spinning of the reels so that the display of spinning changes gradually until the reels lock. The reels then continue to spin together in the second, locked mode.

Example 3

In a third example, each of the reels spins independently under control of the spin controller in a first mode which is not displayed to the player on the display. The first time the reels are displayed is during a transition mode during which the display of spinning changes gradually until the reels lock. The reels then continue to spin together in the second, locked mode.

Example 4

In a fourth example, the spin controller controls display of spinning of the reels so that after the reels are locked in a second mode, a symbol insertion mode results in the insertion of a stack of four symbols into each locked reels. The stack is inserted into the same position on each locked reel so that there are four neighbouring positions on the reels occupied by the same symbol.

It will be understood to persons skilled in the art of the invention that many modifications may be made without departing from the spirit and scope of the invention, in particular it will be apparent that certain features of embodiments of the invention can be employed to form further embodiments. For example, depending on the embodiment, different numbers of symbols may be removed from the symbol display.

In some embodiments, an eligibility criteria may be applied for the player to access the spinning reel mode change feature, for example that the player has made a certain sized wager, made an ante bet, selected all win lines, played sufficient games, or the player is a member of a loyalty program.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of gaming for use with a gaming machine having a credit input mechanism configured to receive a physical item representing a monetary value for establishing a credit balance, the credit balance being increasable and decreasable based at least on wagering activity, credit meters configured to monitor the credit balance, a memory storing a plurality of symbols, a plurality of reels, a display having a plurality of symbol display positions, a payout mechanism, and a game controller, the method comprising generating, in accord with the wagering activity, via the game controller, a game outcome by spinning the plurality of reels to respective stop positions at which a plurality of symbols of each reel are displayed at the symbol display positions;

controlling via the game controller the spinning of the reels prior to the reels reaching their respective stop positions to include a first mode in which all of the reels spin independently of each other, and a second mode in which at least two adjacent reels are synchronized to spin together;

determining via the game controller that a mode change condition is met and switching via the game controller between the first and second modes upon the mode change condition being met;

evaluating via the game controller the game outcome to determine whether to make an award in respect of the game outcome; and in response to determining that an award is to be made in respect of the game outcome, providing via the payout mechanism any determined award.

2. A method as claimed in claim 1, wherein the second mode is subsequent to the first mode.

3. A method as claimed in claim 2, further comprising controlling at least two reels to spin in a transition mode between the first and second modes during which the at least two reels synchronize.

4. A method as claimed in claim 3, wherein the at least two reels are a subset of the reels and remaining reels spin independently of one another and the synchronized reels during the second mode.

5. A method as claimed in claim 3, further comprising adding symbols to each of the synchronized reels prior to or during the second mode.

6. A method as claimed in claim 3, further comprising synchronizing two reels.

7. A method as claimed in claim 3, further comprising synchronizing three reels.

8. A method as claimed in claim 3, further comprising synchronizing four reels.

9. A method as claimed in claim 3, further comprising synchronizing five reels.

10. A method as claimed in claim 3, further comprising, subsequent to the second mode, controlling spinning of the reels so that in a third mode at least one additional reel of the plurality of reels is synchronized to spin together with the at least two reels.

11. A method as claimed in claim 1, wherein there are five reels.

12. A game controller for use with a gaming machine having a credit input mechanism configured to receive a physical item representing a monetary value for establishing a credit balance, the credit balance being increasable and decreasable based at least on wagering activity, credit meters configured to monitor the credit balance, a memory storing a plurality of symbols, a plurality of reels, a display having a plurality of symbol display positions, and a payout mechanism, the game controller configured to:

- generate, in accord with the wagering activity, a game outcome by spinning a plurality of reels to respective stop positions at which the plurality of symbols of each reel are displayed at the symbol display positions;
- control spinning of the reels prior to the reels reaching their respective stop positions to include a first mode in which all of the reels spin independently of each other, and a second mode in which at least two adjacent reels are synchronized to spin together;
- determine that a mode change condition is met and switch between the first and second modes upon the mode change condition being met;
- evaluate the game outcome to determine whether to make an award in respect of the game outcome; and
- in response to determining that an award is to be made in respect of the game outcome, cause the payout mechanism to provide any determined award.

13. A game controller as claimed in claim 12, wherein the second mode is subsequent to the first mode.

14. A game controller as claimed in claim 13, further configured to control at least two reels to spin in a transition mode between the first and second modes during which the at least two reels synchronize.

15. A game controller as claimed in claim 14, wherein the at least two reels are a subset of the reels and remaining reels spin independently of one another and the synchronized reels during the second mode.

16. A game controller as claimed in claim 14, further configured to add symbols to each of the synchronized reels prior to or during the second mode.

17. A game controller as claimed in claim 14, wherein two reels are synchronized.

18. A game controller as claimed in claim 14, wherein three reels are synchronized.

19. A game controller as claimed in claim 14, wherein four reels are synchronized.

20. A game controller as claimed in claim 14, wherein five reels are synchronized.

21. A game controller as claimed in claim 14, configured to, subsequent to the second mode, control spinning of the reels so that in a third mode at least one additional reel of the plurality of reels is synchronized to spin together with the at least two reels.

22. A gaming machine as claimed in claim 13, wherein the reel spin controller is configured to control at least two reels to spin in a transition mode between the first and second modes during which the at least two reels synchronize.

23. A gaming machine as claimed in claim 22, wherein the at least two reels are a subset of the reels and remaining reels spin independently of one another and the synchronized reels during the second mode.

24. A gaming system as claimed in 22, further configured to add symbols to each of the synchronized reels prior to or during the second mode.

25. A gaming system as claimed in claim 22, wherein there are five reels.

26. A gaming system as claimed in claim 22, wherein two reels are synchronized.

27. A gaming system as claimed in claim 22, wherein three reels are synchronized.

28. A gaming system as claimed in claim 22, wherein four reels are synchronized.

29. A gaming system as claimed in claim 22, wherein five reels are synchronized.

30. A game controller as claimed in claim 12, wherein there are five reels.

31. A gaming machine comprising:

- a credit input mechanism configured to receive a physical item representing a monetary value for establishing a credit balance, the credit balance being increasable and decreasable based at least on wagering activity;
- credit meters configured to monitor the credit balance;
- a memory storing a plurality of symbols;
- a plurality of reels;
- a display having a plurality of symbol display positions;
- an outcome generator configured to, in accord with the wagering activity, generate a game outcome by spinning the plurality of reels to respective stop positions at which a plurality of symbols of each reel are displayed at the symbol display positions;
- a reel spin controller configured to control spinning of the reels prior to the reels reaching their respective stop positions to include a first mode in which all of the reels spin independently of each other, and a second mode in which at least two adjacent reels are synchronized to spin together;
- an outcome evaluator configured to evaluate the game outcome to determine whether to make an award in respect of the game outcome;
- a mode change monitor configured to determine that a mode change condition is met and, wherein the reel spin controller, switches between the first and second modes upon the mode change condition being met; and
- a payout mechanism configured to provide any determined award in response to determining that an award is to be made in respect of the game outcome.

32. A gaming machine as claimed in claim 31, wherein the second mode is subsequent to the first mode.

33. A gaming system as claimed in claim 31, wherein the reel spin controller is configured to, subsequent to the second mode, control spinning of the reels so that in a third mode at least one additional reel of the plurality of reels is synchronized to spin together with the at least two reels.

* * * * *